(12) United States Patent
Kawamoto et al.

(10) Patent No.: US 9,005,824 B2
(45) Date of Patent: Apr. 14, 2015

(54) LITHIUM SECONDARY BATTERY

(71) Applicant: Hitachi Maxell, Ltd., Otokuni-gun, Kyoto (JP)

(72) Inventors: Yuta Kawamoto, Ibaraki (JP); Haruki Kamizori, Ibaraki (JP); Yusuke Nakamura, Ibaraki (JP); Masayuki Yamada, Ibaraki (JP); Itaru Gosho, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 120 days.

(21) Appl. No.: 13/923,838

(22) Filed: Jun. 21, 2013

(65) Prior Publication Data
US 2013/0344381 A1 Dec. 26, 2013

(30) Foreign Application Priority Data

Jun. 22, 2012 (JP) ................................. 2012-140447
Dec. 21, 2012 (JP) ................................. 2012-279280

(51) Int. Cl.
 H01M 6/16 (2006.01)
 H01M 10/0567 (2010.01)
 H01M 10/052 (2010.01)
 H01M 4/134 (2010.01)
 H01M 10/0525 (2010.01)
 H01M 10/0569 (2010.01)

(52) U.S. Cl.
 CPC ........ *H01M 10/0567* (2013.01); *H01M 10/052* (2013.01); *Y02E 60/122* (2013.01); *H01M 4/134* (2013.01); *H01M 10/0525* (2013.01); *H01M 10/0569* (2013.01)

(58) Field of Classification Search
 CPC ................. H01M 10/0525; H01M 10/0569; H01M 10/0567; H01M 4/134
 USPC ................................................ 429/338, 337
 See application file for complete search history.

(56) References Cited

U.S. PATENT DOCUMENTS 6,210,840 B1 * 4/2001 Usami et al. .................. 429/325

FOREIGN PATENT DOCUMENTS

JP 2008-262908 A 10/2008
JP 2009-140919 A 6/2009

* cited by examiner

*Primary Examiner* — Helen O Conley
(74) *Attorney, Agent, or Firm* — Westerman, Hattori, Daniels & Adrian, LLP

(57) ABSTRACT

There is provided a lithium secondary battery including a positive electrode, a negative electrode, a nonaqueous electrolyte liquid and a separator, that is subjected to a constant-current constant-voltage charge with a stop voltage of more than 4.25V before its use. The lithium secondary battery uses the nonaqueous electrolyte liquid having contained 0.1 to 5 mass % of a phosphonoacetate compound represented by the following general formula (1), and having contained 0.1 to 5 mass % of 1,3-dioxane. In General Formula (1), each of $R^1$, $R^2$ and $R^3$ is independently hydrocarbon groups having a carbon number of 1 to 12 with or without substituent of a halogen atom, and n is 0 to 6 integers.

Chemical Formula 1

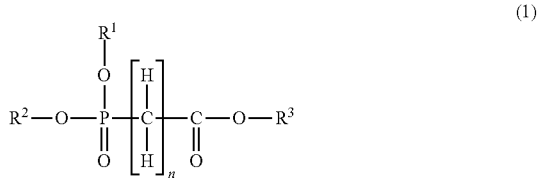

(1)

12 Claims, 2 Drawing Sheets (a)

(b)

LITHIUM SECONDARY BATTERY

TECHNICAL FIELD

The present invention relates to a lithium rechargeable battery that is good in load property, charge discharge cycle property and storage property, even when being charged at a cell voltage in a high voltage region over 4.25V.

BACKGROUND OF THE INVENTION

In recent years, a lithium secondary battery as demanded is to have a small size, a light weight, and a high capacity, upon development of portable electronic equipments such as cell phones and notebook-sized personal computers, or practical use of electric vehicles.

Also, the lithium secondary battery is requested to improve various batteries properties along with high-capacity as expanding the apparatus application.

As one way to achieve the improvement of the battery properties in the lithium secondary batteries, it is known to add various additives in the nonaqueous electrolyte liquid of the lithium secondary batteries. For example, Patent Reference 1 discloses that a lithium secondary battery can be improved in view of the charge discharge cycle property and the storage property when using a nonaqueous electrolyte liquid containing a phosphonoacetate compound having a specific structure.

Patent Reference 2 discloses that a lithium secondary battery can be improved in view of the charge discharge cycle properties when using a nonaqueous electrolyte liquid containing 1,3-dioxane and a sulfonate compound.

PRIOR ART REFERENCES

Patent Reference No. 1: Japanese Laid-Open Patent Publication 2008-262908
Patent Reference No. 2: Japanese Laid-Open Patent Publication No. 2009-140919

SUMMARY OF THE INVENTION

The Objectives to Solve by the Invention

By the way, one technique to consider is to raise the charge voltage in order to make a lithium secondary battery a high capacity. For example, in current lithium secondary batteries, it is general to set the upper limit of the charge voltage to reach a cell voltage of around 4.25V, but this technique is to raise the charge voltage more than the value above, so as to further attempt to achieve a high-capacity.

However, when conventional lithium secondary batteries are charged such that the cell voltage exceeds 4.25V, their load property and charge discharge cycle property might be decreased.

For example, the nonaqueous electrolyte liquid having contained the additive as disclosed in Patent Reference 1 is effective to improve the charge discharge cycle property and the storage property of the battery, as explained before. However, even if containing the additives, it is not easy to restrain the drop of the load property and the charge discharge cycle property of the lithium secondary battery when it is charged such that the cell voltage exceeds 4.25V.

The present invention has been accomplished under the circumstances above, and therefore, the objective is to provide a lithium secondary battery that is good in the load property, the charge discharge cycle property and the storage property even when it is charged such that the cell voltage exceeds 4.25V.

Means to Solve the Problems

In order to accomplish the objective above, there is provided a lithium secondary battery, comprising a positive electrode, a negative electrode, a nonaqueous electrolyte liquid and a separator, subjected to a constant-current constant-voltage charge is applied with a stop voltage of more than 4.25V before using. The nonaqueous electrolyte liquid used in the lithium secondary battery of the present invention contains 0.1 to 5 mass % of a phosphonoacetate compound represented by General Formula (1), and 0.1 to 5 mass % of 1,3-dioxane.

Chemical Formula 1

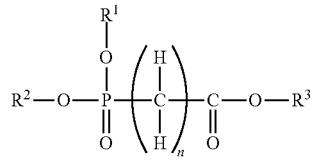

(1)

In General Formula (1), each of $R^1$, $R^2$ and $R^3$ is independently hydrocarbon groups having a carbon number of 1 to 12 with or without substituent of a halogen atom, and n is 0 to 6 integers.

Effect of the Invention

According to the present invention, a lithium secondary battery can be provided which is good in the load property, the charge discharge cycle property and the storage property even when it is charged such that the cell voltage exceeds 4.25V.

BRIEF DESCRIPTION OF THE DRAWINGS

FIG. 1 schematically shows an example of the lithium secondary battery of the present invention, in which FIG. 1(a) is a plan view, and FIG. 1(b) is a partial longitudinal cross-sectional view.

EMBODIMENTS TO CARRY OUT THE INVENTION

Figure 1:
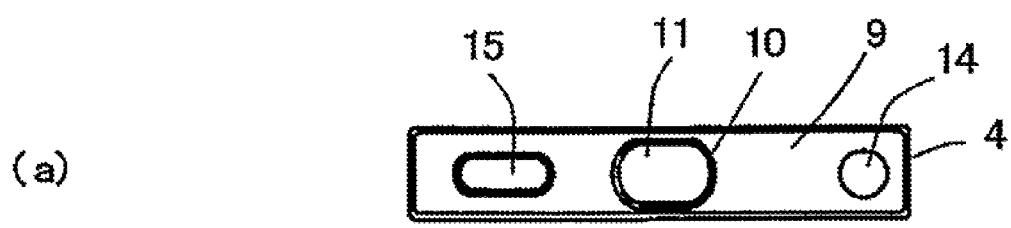
Figure 1:
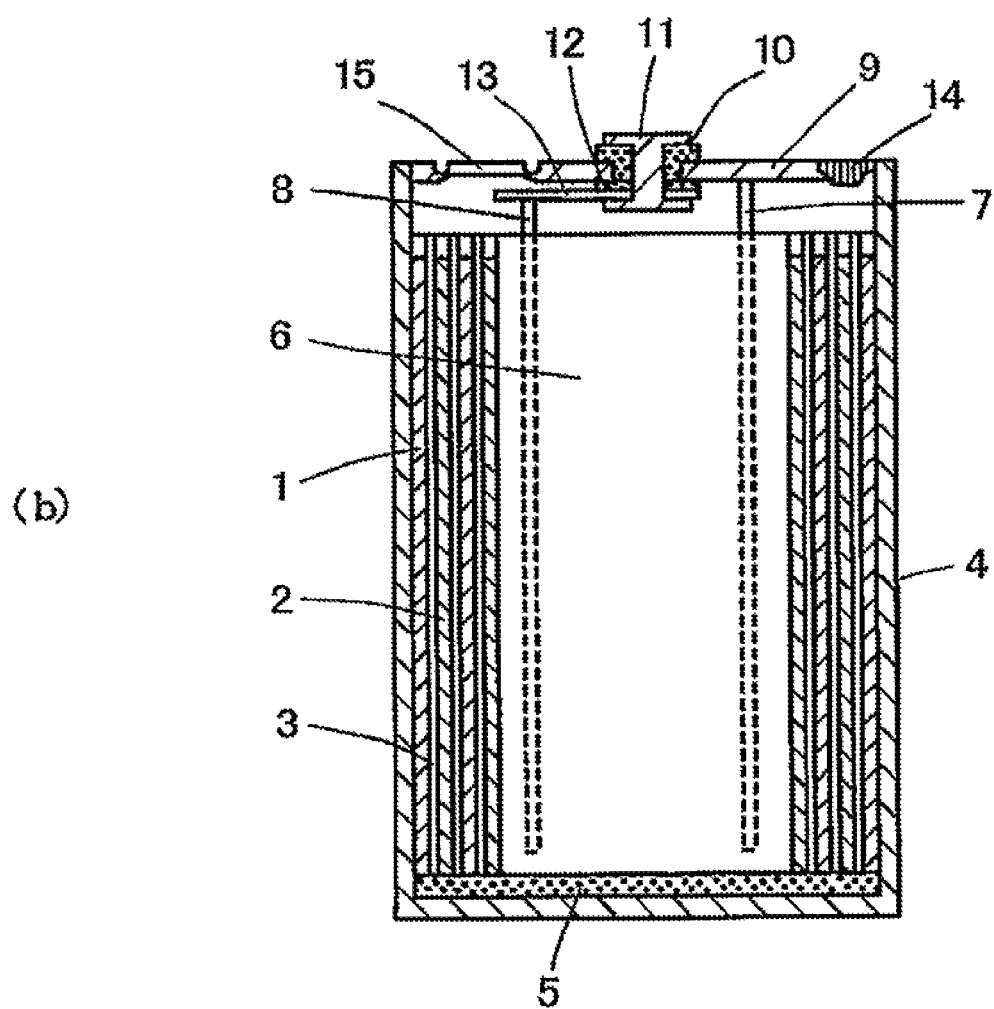

The phosphonoacetate compound represented by General Formula (1) acts as follows: When it is added in the nonaqueous electrolyte liquid of the lithium secondary battery, it can restrict the generation of swollenness of the lithium secondary battery, and it can improve the storage property thereof, even if the battery is charged such that the cell voltage exceeds e.g., 4.25V. On the other hand, it can act to deteriorate the load property and the charge discharge cycle property of the lithium secondary battery.

The phosphonoacetate compound represented by General Formula (1) has a function to form a film at the negative electrode surface inside the lithium secondary battery. This film can prevent the nonaqueous electrolyte liquid from decomposing due to the contact with the negative electrode, thereby restricting the gas generation to restrain the swollenness of the lithium secondary battery.

However, if the cell voltage becomes in a condition to exceed 4.25V, it is assessed that the phosphonoacetate compound represented by General Formula (1) contacts the positive electrode to be decomposed, thereby causing the drop of the load property and the charge discharge cycle property of the lithium secondary battery.

Therefore, the present invention has accomplished by using 1,3-dioxane together with the phosphonoacetate compound represented by General Formula (1) as additives of the nonaqueous electrolyte liquid. Here, 1,3-dioxane has a function to form a film on the positive electrode surface when it is added in the nonaqueous electrolyte liquid of the lithium secondary battery. Then, the film derived from 1,3-dioxane formed on the positive electrode surface can restrain the decomposition of the phosphonoacetate compound represented by General Formula (1) at the positive electrode surface, thereby restricting the drop of the load property of the lithium secondary battery.

Also, when a lithium secondary battery is stored in a charged state under a high temperature environment, it is common that the post-storage discharge capacity becomes lower than the pre-storage capacity. However, when 1,3-dioxane is added in the nonaqueous electrolyte liquid of the lithium secondary battery, it can serve to restrain the phenomena that the recovery capacity after the high temperature storage (i.e., discharge capacity in which a lithium secondary battery is stored in a charged state under a high temperature, and then, discharged, and then it is subjected to the charge discharge operation) becomes lower that pre-storage capacity. Thus, in the lithium secondary battery of the present invention, a good storage property can be achieved by the effect of 1,3-dioxane together with the effect of the phosphonoacetate compound represented in General Formula (1) to restrain the battery swollenness under the high temperature storage.

Furthermore, 1,3-dioxane acts to raise the charge discharge cycle property when it is added in the nonaqueous electrolyte liquid of the lithium secondary battery. In addition, when it is added in the nonaqueous electrolyte liquid together with the phosphonoacetate compound represented by General Formula (1), it was found that it acts to raise the charge discharge cycle property of the lithium secondary battery beyond the effects to improve the charge discharge cycle property by using 1,3-dioxane alone. The reasons are uncertain, but in the lithium secondary battery of the present invention, a combination of the phosphonoacetate compound represented by general formula (1) with 1,3-dioxane is considered to act as follows. For example, it is considered that the decomposition is restricted by the effect of the phosphonoacetate compound represented by General Formula (1) to suppress the drop of the charge discharge cycle property. In addition, it is considered that the charge discharge cycle property can be improved.

In the lithium secondary battery of the present invention, these actions can achieve the high capacity of the battery when applying it to the constant-current constant-voltage charge at a stop voltage of more than 4.25V. In addition, the invention can assure the superiority in the load property, the charge discharge cycle property and the storage property.

As the nonaqueous electrolyte liquid of the lithium secondary battery of the present invention, used is a solution that dissolves a lithium salt in an organic solvent, containing the phosphonoacetate compound represented by General Formula (1) and 1,3-dioxane.

In General Formula (1) representing the phosphonoacetate compound, each of $R^1$, $R^2$ and $R^3$ is independently a hydrocarbon group with a carbon number of 1 to 12 with or without substituent of a halogen atom (e.g., an alkyl group).

For example, the specific examples of the phosphonoacetate compound represented by General Formula (1) are listed below.

<Compound in which n=0 in General Formula (1)>

Trimethyl phosphonoformate, methyldiethyl phosphonoformate, methyl dipropyl phosphonoformate, methyl dibutyl phosphonoformate, triethyl phosphonoformate, ethyl dimethyl phosphonoformate, ethyl dipropyl phosphonoformate, ethyl dibutyl phosphonoformate, tripropyl phosphonoformate, propyl dimethyl phosphonoformate, propyl diethyl phosphonoformate, propyl dibutyl phosphonoformate, tributyl phosphonoformate, butyl dimethyl phosphonoformate, butyl diethyl phosphonoformate, butyl dipropyl phosphonoformate, methyl bis(2,2,2-trifluoroethyl) phosphonoformate, ethyl bis(2,2,2-trifluoroethyl) phosphonoformate, propyl bis(2,2,2-trifluoroethyl) phosphonoformate, and butyl bis(2,2,2-trifluoroethyl) phosphonoformate, and etc.

<Compound in which n=1 in General Formula (1)>

Trimethyl phosphonoacetate, methyl diethyl phosphonoacetate, methyl dipropyl phosphonoacetate, methyl dibutyl phosphonoacetate, triethyl phosphonoacetate, ethyl dimethyl phosphonoacetate, ethyl dipropyl phosphonoacetate, ethyl dibutyl phosphonoacetate, tripropyl phosphonoacetate, propyl dimethyl phosphonoacetate, propyl diethyl phosphonoacetate, propyl dibutyl phosphonoacetate, tributyl phosphonoacetate, butyl dimethyl phosphonoacetate, butyl diethyl phosphonoacetate, butyl dipropyl phosphonoacetate, methyl bis(2,2,2-trifluoroethyl)phosphonoacetate, ethyl bis(2,2,2-trifluoroethyl)phosphonoacetate, propyl bis(2,2,2-trifluoroethyl)phosphonoacetate, butyl bis(2,2,2-trifluoroethyl) phosphonoacetate, 2-propynyl (diethylphosphono)acetate, and etc.

<Compound in which n=2 in General Formula (1)>

Trimethyl-3-phosphonopropionate, methyl diethyl-3-phosphonopropionate, methyl dipropyl-3-phosphonopropionate, methyl dibutyl-3-phosphonopropionate, triethyl-3-phosphonopropionate, ethyl dimethyl-3-phosphonopropionate, ethyl dipropyl-3-phosphonopropionate, ethyl dibutyl-3-phosphonopropionate, tripropyl-3-phosphonopropionate, propyl dimethyl-3-phosphonopropionate, propyl diethyl-3-phosphonopropionate propyl dibutyl-3-phosphonopropionate, tributyl-3-phosphonopropionate, butyl dimethyl-3-phosphonopropionate, butyl diethyl-3-phosphonopropionate, butyl dipropyl-3-phosphonopropionate, methyl bis(2,2,2-trifluoroethyl)-3-phosphonopropionate, ethyl bis(2,2,2-trifluoroethyl)-3-phosphonopropionate, propyl bis(2,2,2-trifluoroethyl)-3-phosphonopropionate, butyl bis(2,2,2-trifluoroethyl)-3-phosphonopropionate, and etc.

<Compound in which n=3 in General Formula (1)>

Trimethyl-4-phosphonobutylate, methyl diethyl-4-phosphonobutylate, methyl dipropyl-4-phosphonobutylate, methyl dibutyl-4-phosphonobutylate, triethyl-4-phosphonobutylate, ethyl dimethyl-4-phosphonobutylate, ethyl dipropyl-4-phosphonobutylate, ethyl dibutyl-4-phosphonobutylate, tripropyl-4-phosphonobutylate, propyl dimethyl-4-phosphonobutylate, propyl diethyl-4-phosphonobutylate, propyl dibutyl-4-phosphonobutylate, tributyl-4-phosphonobutylate, butyl dimethyl-4-phosphonobutylate, butyl diethyl-4-phosphonobutylate, butyl dipropyl-4-phosphonobutylate, and etc.

Among the phosphonoacetate compounds as listed above, ethyl diethyl phosphonoacetate (EDPA) and 2-propynyl (diethylphosphono) acetate (PDEA) are particularly preferable.

Regarding the content of the phosphonoacetate compound represented by General Formula (1) in the nonaqueous electrolyte liquid used in a lithium secondary battery, the followings can be considered. It is added to restrain the battery swollenness particularly during the high temperature storage in a high voltage charge state. It is also added to assure the effect to improve the charge discharge cycle property of the battery by the combination of 1,3-dioxane therewith. In view of the above, it can be 0.1 mass % or more, and favorably 0.5 mass % or more. On the other hand, when using too much quantity of the phosphonoacetate compound in the nonaqueous electrolyte liquid, it may deteriorate the load property and the charge discharge cycle property of the battery, as well as the storage property. Thus, the content of the phosphonoacetate compound represented by General Formula (1) in the nonaqueous electrolyte liquid used in the lithium secondary battery can be 5 mass % or less, preferably 2.5 mass % or less.

The content of 1,3-dioxane in the nonaqueous electrolyte liquid used in the lithium secondary battery can be as follows. It is added to improve the load property of the battery when charged at high voltage, and the capacity recovery properties after the high temperature storage. Also, it is added to assure the effect to raise the charge discharge cycle property of the battery in combination with the phosphonoacetate compound represented by General Formula (1). In view of the above, it can be 0.1 mass % or more, and favorably 0.5 mass % or more. On the other hand, when using too much quantity of 1,3-dioxane in the nonaqueous electrolyte liquid, the battery may be deteriorated in view of the load property, the charge discharge cycle property of the battery, and the storage property. Thus, the content of 1,3-dioxane in the nonaqueous electrolyte liquid used in the lithium secondary battery can be 5 mass % or lower, and preferably, 2.5 mass % or lower.

Also, it is preferable to use the nonaqueous electrolyte liquid containing a halogen-substituted cyclic carbonate. The halogen-substituted cyclic carbonate can act on the negative electrode, thereby restraining the reaction between the negative electrode and the ingredients in the nonaqueous electrolyte liquid. Thus, by using the nonaqueous electrolyte liquid additionally including such a halogen-substituted cyclic carbonate, a lithium secondary battery can be provided with better charge discharge cycle property.

As a cyclic carbonate with halogen substituent, the compound represented by General Formula (2) can be used.

Formula 2

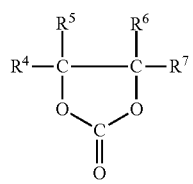

(2)

In General Formula (2), each of $R^4$, $R^5$, $R^6$ and $R^7$ represents hydrogen, halogen or an alkyl group having a carbon number of 1 to 10, and here, a part or all of the hydrogen sites of the alkyl group can be substituted halogen, and at least one of $R^4$, $R^5$, $R^6$ and $R^7$ is halogen. $R^4$, $R^5$, $R^6$ and $R^7$ can be different from each other, or two or more of them can be the same. When $R^4$, $R^5$, $R^6$ and $R^7$ are alkyl groups, it is favorable that their carbon number(s) can be as little as possible. As the halogen, fluorine is particularly preferable.

Among the halogen-substituted cyclic carbonates, it is particularly favorale to use 4-fluoro-1,3-dioxolane-2-one (FEC).

Regarding the content of the halogen-substituted cyclic carbonate in the nonaqueous electrolyte liquid used in the lithium secondary battery, it is added to secure the effect by use. In view of the above, it is favorable to be 0.1 mass % or more, and more favorable to be 0.5 mass % or more. However, when including excess content of the halogen-substituted cyclic carbonate in the nonaqueous electrolyte liquid, the effect to improve the storage properties can be deteriorated. Therefore, the content of the halogen-substituted cyclic carbonate in the nonaqueous electrolyte liquid used in the lithium secondary battery can favorably be 10 mass % or less, and more favorably 5 mass % or less.

Furthermore, it is favorable that vinylene carbonate (VC) is included in the nonaqueous electrolyte liquid. VC acts on the negative electrode (particularly on the negative electrode using carbon materials as negative electrode active material) to restrain the reaction between the negative electrode and the nonaqueous electrolyte liquid ingredient. Thus, by further containing VC in the nonaqueous electrolyte liquid, the lithium secondary battery can be provided with better charge discharge cycle property.

Regarding the content of VC in the nonaqueous electrolyte liquid used in the lithium secondary battery, it is added to secure the effect by the use thereof. In view of the above, it is favorable to be 0.1 mass % or more, and more favorable to be 1.0 mass % or more. However, when containing too much VC in the nonaqueous electrolyte liquid, the improvement effect of the storage properties might be deteriorated. Thus, the content of VC in the nonaqueous electrolyte liquid used in the lithium secondary battery is favorably 10 mass % or lower, and more favorably 4.0 mass % or lower.

As the lithium salt used in the nonaqueous electrolyte liquid, it can be used without any particular restriction if it dissociates in a solvent to form $Li^+$ ion while limiting side reactions such as decomposition in a voltage range used as a battery. For example, the examples can include inorganic lithium salts such as $LiClO_4$, $LiPF_6$, $LiBF_4$, $LiAsF_6$, $LiSbF_6$; and organic lithium salts such as $LiCF_3SO_3$, $LiCF_3CO_2$, $Li_2C_2F_4$ $(SO_3)_2$, $LiN(CF_3SO_2)_2$, $LiC(CF_3SO_2)_3$, $LiCnF_{2n+1}SO_3$ (n≥2), $LiN(RfOSO_2)_2$, [here, Rf is fluoroalkyl group].

The concentration of the lithium salt in the nonaqueous electrolyte liquid can be favorably 0.5 to 1.5 mol/l, and more favorably 0.9 to 1.25 mol/l.

As the organic solvent used in the nonaqueous electrolyte liquid, it can be used without any restriction if it dissolves the lithium salt while it does not cause side reactions such as decomposition in a voltage range used in the battery. For example, the examples can include: cyclic carbonates such as ethylene carbonate, propylene carbonate, and butylene carbonate; chain carbonates such as dimethyl carbonate, diethyl carbonate, and methylethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as 1,4-dioxane, tetrahydrofuran, and 2-methyl tetrahydrofuran; nitriles such as acetonitrile, propionitrile, and methoxypropionitrile; and sulfite esters such as ethylene glycol sulfite; and these can be used in a mixture of two or more. Also, in order to make the battery with better performance, it can be favorable to use a combination thereof, such as a mixture solvent of ethylene carbonate and a chain carbonate, in order to improve the high conductivity.

Also, regarding the nonaqueous electrolyte liquid used in the lithium secondary battery, it can be intended to further improve the charge discharge cycle property or improve the safety such as high temperature storage stability and overcharge prevention property. In view of the above, additives such as acid anhydride, sulfonate, dinitrile, 1,3-propane sultone, diphenyl disulfide, cyclohexylbenzene, biphenyl, fluorobenzene, and t-butyl benzene (including derivatives thereof) can be appropriately added.

Furthermore, the nonaqueous electrolyte liquid of the lithium secondary battery can be one containing known gelatinizers, such as a polymer, added in the nonaqueous electrolyte liquid to make it in gelation (i.e., gelatinous electrolyte).

The lithium secondary battery of the present invention includes a positive electrode, a negative electrode, a nonaqueous electrolyte liquid and a separator. In addition, the nonaqueous electrolyte liquid is the one as explained above. The constitutions and structures other than the above are not particularly limited, and can be modified by adopting the ways that conventionally known in the lithium secondary batteries.

For example, the positive electrode of the lithium secondary battery can be provided with a structure in which one side or both sides of the current collector has formed a positive electrode mixture layer including positive electrode active material, binder and conductive assistant.

The positive electrode active material below can be used: lithium cobalt oxides such as $LiCoO_2$; lithium manganese oxides such as $LiMnO_2$, and $Li_2MnO_3$; lithium nickel oxides such as $LiNiO_2$; lithium-containing complex oxides having a layer structure such as $LiCo_{1-x}NiO_7$; lithium-containing complex oxides having a spinel structure such as $LiMn_2O_4$, and $Li_{4/3}Ti_{5/3}O_4$; lithium-containing complex oxides having an olivine structure such as $LiFePO_4$; and oxides in which the basic compositions of the oxides as identified above are used, but including substituents of various elements.

Among the lithium-containing complex oxides, in view of higher capacity, it can be ones represented by general composition formula (3), as follows, can be used.

$$Li_{1+a}Ni_{1-b-c-d}Co_bMn_cM^1_dO_2 \qquad (3)$$

In general composition formulae (3), $M^1$ is at least one kind of element selected from the group of Mg, Al, Ti, Fe, Cu, Zn, Ga, Ge, Zr, Nb, Mo, Sn, W, B, P, Ba and Bi, while satisfying $-0.15 \leq a \leq 0.15$, $0.05 \leq b \leq 0.4$, $0.005 \leq c \leq 0.4$, $0 \leq d \leq 0.03$ and $b+c+d \leq 0.7$.

By the way, when satisfying $b+c+d \leq 0.3$ or including a high Ni content in the lithium-containing complex oxide represented by general composition formula (3), it has been known that the high temperature stability decreases. The phenomena above relates to the fact that Ni is vulnerable to heat. However, even when using a positive electrode active material having a high Ni content such as a lithium-containing complex oxide satisfying $b+c+d \leq 0.3$ in general composition formula (3), the lithium secondary battery of the present invention can improve not only the load property and the charge discharge cycle property but also the high temperature storage property.

Also, as the positive electrode active material, it is favorable to use lithium-containing complex oxide represented by the general composition formula (3) (i.e., lithium nickel cobalt manganese oxide) together with lithium cobalt oxide such as oxide represented by $LiCoO_2$ or general composition formula (4).

$$Li_{1+o}Co_{1-p-q}Mg_pM^2_qO_2 \qquad (4)$$

In general composition formulae (4), $M^2$ is at least one kind of element selected from the group of Al, Ti, Fe, Cu, Zn, Ga, Ge, Zr, Nb, Mo, Sn, W, B, P and Bi, satisfying $-0.3 \leq o \leq 0.3$, $0.001 \leq p \leq 0.1$ and $0 < q \leq 0.1$.

When the lithium nickel cobalt manganese oxide is used together with the lithium cobalt oxide as the positive electrode active material, the content of the lithium cobalt oxide can be preferably 50 to 90 mass % in total (100 mass %).

As the binder of the positive electrode mixture layer, the example can include polyvinylidene fluoride (PVDF), polytetrafluoroethylene (PTFE), styrene-butadiene rubber (SBR), and carboxymethyl cellulose (CMC). Also, as the conductive assistant of the positive electrode mixture layer, the example can be carbon materials including: graphites such as natural graphite (e.g., scale-like graphite) and artificial graphite (e.g., graphitizing carbon material); carbon black such as acetylene black, ketjen black, channel black, furnace black, lamp black, and thermal black; and carbon fibers.

For example, the positive electrode can be prepared as follows: A positive electrode active material, a binder, a conductive assistant and etc. are dispersed in a solvent such as N-methyl-2-pyrrolidone (NMP) to prepare a positive electrode mixture composition in a paste or slurry state (here, the binder may be dissolved in the solvent), which is then applied on one side or both side of a current collector, and dried, and then, a calendar process is applied, if necessary. It is noted that the manufacturing method of the positive electrode is not limited thereto, and other methods can be used.

Also, the positive electrode can be provided with a lead body for connecting it to other members inside the lithium secondary battery electrically, if necessary, which can be attached to by a known method.

For example, the thickness of the positive electrode mixture layer can be favorably 10 to 100 μm formed per each side of the current collector. As the composition of the positive electrode mixture layer, for example, it is favorable that the quantity of the positive electrode active material is 60 to 95 mass %, and it is favorable that the quantity of the binder is 1 to 15 mass %, and, it is favorable that the quantity of the conductive assistant is 3 to 20 mass %.

As the current collector of the positive electrode, it can be one that has conventionally known as used in the positive electrode of known lithium secondary batteries. For example, an aluminum foil with a thickness of 10 to 30 μm can be favorably used.

As the negative electrode of the lithium secondary battery, the example can include a structure in which one side or both sides of a current collector has formed a negative electrode mixture layer made of a negative electrode mixture including e.g., a negative electrode active material and a binder, and a conductive assistant, if necessary.

The example of the negative electrode active material can include graphite, thermolysis carbon, coke, glassy carbon, burned form of organic polymer compounds, mesocarbon microbeadses, carbon fiber, activated carbon, metal that can make lithium alloy (e.g., Si and Sn) or its alloy or oxide. These can be used alone or in combination of two or more kinds.

Among the negative electrode active material as listed above, it is favorable to use a material including Si and O as its constituent elements (here, it is note that the atom ratio x of O to Si is $0.5 \leq x \leq 1.5$; which is hereinafter "$SiO_x$.") in order to achieve the high capacity of the battery.

$SiO_x$ can include a Si microcrystalline phase or a Si amorphous phase. In this case, the atomic ratio of Si and O is a ratio calculated by including the Si microcrystalline phase or Si amorphous phase. In other words, materials represented by $SiO_x$ include those having a structure in which Si (e.g., microcrystalline Si) is dispersed in the amorphous $SiO_2$ matrix. In this case, the atomic ratio x, including the amorphous $SiO_2$ and Si dispersed in the amorphous $SiO_2$, can satisfy $0.5 \leq x \leq 1.5$. For example, in case of the material having a structure in which Si is dispersed in the amorphous $SiO_2$ matrix and the molar ratio of $SiO_2$ to Si is 1:1, x is equal to 1 (x=1). Here, this material is referred to as SiO in the present invention. When the material having such a structure is analyzed by, for example, X-ray diffractometry, a peak resulting from the presence of Si (microcrystalline Si) might not be observed. However, when the material is observed under the transmission electron microscope, the presence of fine Si can be found.

Also, it is favorable that $SiO_x$ is in a composite with a carbon material. For example, it is favorable that the surface of the $SiO_x$ is coated with the carbon material. $SiO_x$ has a poor conductivity. Therefore, if this is used as the negative electrode active material, it needs to secure the good battery properties. Thus, by using a conductive material (i.e., conductive assistant), the mixing and the dispersing of the $SiO_x$ and the conductive material in the negative electrode can be improved, thereby forming a superior conductive network. By using the composite of the $SiO_x$ and the carbon material, a better conductive network can be formed in the negative electrode rather than using a material obtained by only mixing the $SiO_x$ with the carbon material.

The composite of the $SiO_x$ and the carbon material can be provided with surfaces of the $SiO_x$ having coated with the carbon material. In addition, the granules of the $SiO_x$ and the carbon material can be used.

Also, the composite having the $SiO_x$ surfaces coated with the carbon material can be modified into another composite by using another conductive material (e.g., carbon material). As a result, more advantageous conductive network can be formed in the negative electrode, thereby attaining a lithium secondary battery with a higher capacity and improving the battery properties (e.g., charge discharge cycle property). The following can be the example of so modified composite including another carbon material in combination with the composite of the $SiO_x$ having covered with the carbon material. Namely, the example can be granules obtained by granulating a mixture of a composite of the $SiO_x$ having coated with the carbon material, together with another carbon material.

As the $SiO_x$ whose surfaces are coated with the carbon material, the following composite can be also used. Such a composite has a structure in which the surfaces of the $SiO_x$-carbon material composite (e.g., granules; the carbon material has a smaller specific resistance than the $SiO_x$) are coated with another carbon material. When the $SiO_x$ and the carbon material are dispersed in the granules, more advantageous conductive network can be formed. Therefore, it is possible to further improve the lithium secondary battery by using the negative electrode containing the $SiO_x$ as the negative electrode active material, in view of the battery properties such as the heavy load discharge properties.

The examples of the carbon materials used to form the composite of the $SiO_x$ can include carbon materials such as low crystalline carbon, carbon nanotube, and vapor-grown carbon fiber.

In more detail, the carbon material can be at least one material selected from the group as follows: a fibrous or coil-shaped carbon material, carbon black (including acetylene black and ketjen black), artificial graphite, easily graphitizable carbon, and hardly graphitizable carbon. A fibrous or coil-shaped carbon material can be used because it facilitates the formation of a conductive network and has a large surface area. Carbon black (including acetylene black and ketjen black), easily graphitizable carbon and hardly graphitizable carbon can be used because they have high electrical conductivity and high liquid-holding ability, and moreover, they have the property of readily maintaining the contact with the $SiO_x$ particles therebetween even if the particles expand and/or shrink.

As described later in detail, while it is favorable in the present invention to use graphite together with $SiO_x$ as the negative electrode active material, such graphite can be used as the carbon material for the composite of the $SiO_x$ and the carbon material. The graphite has high electrical conductivity, and high liquid retention property, like carbon black. Furthermore, even when $SiO_x$ particles are expanded or shrunk, graphite has a property that is easy to maintain the contact with the particles, so that it can be favorably used in a composite formation with $SiO_x$.

Among the carbon materials described above, fibrous carbon material can be used to form the $SiO_x$ composite in the form of granules. Since the fibrous carbon material has a thin thready shape and is highly flexible, it can respond to expansion and/or shrinkage of the $SiO_x$ associated with charging/discharging of the battery. Also, the fibrous carbon material has a large bulk density, so that it can have many contacts with the $SiO_x$ particles. The examples of the fibrous carbon can include polyacrylonitrile (PAN) carbon fiber, pitch carbon fiber, vapor-grown carbon fiber, and carbon nanotube.

It is also possible to form the fibrous carbon material on the surface of the $SiO_x$ particles by means of, e.g., vapor phase method.

$SiO_x$ generally has a specific resistance of $10^3$ to $10^7$ kΩcm, whereas the carbon materials described above has a specific resistance of $10^5$ to 10 kΩcm.

Further, the composite of the $SiO_x$ and the carbon material can be further provided with a material layer (material layer containing hardly graphitizable carbon) covering the carbon material coating layer on the particle surfaces.

When using the $SiO_x$-carbon material composite in the negative electrode, the ratio of the carbon material to the $SiO_x$ can be 5 parts by mass or more, and in particular, 10 parts by mass or more of the carbon material to 100 parts by mass of $SiO_x$. As a result, it is possible to exhibit the effects resulting from the compositing the $SiO_x$ with the carbon material. If the carbon material composited with the $SiO_x$ makes up an excessively large proportion in the composite, it may lead to a decline of the amount of the $SiO_x$ contained in the negative electrode mixture layer, thereby deteriorating the effect to increase the capacity. For this reason, the ratio of the carbon material to the $SiO_x$ can be 50 parts by mass or less, and in particular, 40 parts by mass or less of the carbon material to 100 parts by mass of the $SiO_x$.

For example, the $SiO_x$-carbon material composite can be obtained as follows.

First, a method for producing the composite of the $SiO_x$ is described. A dispersion liquid is prepared in which the $SiO_x$ are dispersed in a dispersion medium. Then, the dispersion liquid is sprayed and dried to produce composite particles composed of a plurality of particles. For example, ethanol can be used as the dispersion medium. It can be suitable to spray the dispersion liquid in e.g., a 50 to 300° C. atmosphere. Other than the method described here, similar composite particles can be obtained by means of the way, such as the mechanical granulation method using a vibration or planetary ball mill or a rod mill.

When producing granules of the $SiO_x$ and the carbon material having a smaller specific resistance than the $SiO_x$, the carbon material is added to a dispersion liquid of the $SiO_x$ dispersed in a dispersion medium. Using this dispersion liquid, the composite particles (granules) can be produced by the way same as compositing the $SiO_x$. Also, the $SiO_x$-carbon material granules can be produced by means of the ways same as the mechanical granulation method described above.

Next, when producing a composite by coating the surface of $SiO_x$ particles ($SiO_x$ composite particles, or $SiO_x$-carbon material granules) with the carbon material, the $SiO_x$ particles and hydrocarbon gas are heated in a vapor phase to deposit carbon generated by thermal decomposition of the hydrocarbon gas on the surface of the particles. In this way, the hydrocarbon gas can be distributed throughout the composite particles by chemical-vapor deposition (CVD), so that a thin and uniform coating containing the conductive carbon material (i.e., carbon material coating layer) can be formed on the surface of the particles as well as the holes on the surfaces. Thus, the conductivity can be imparted to the $SiO_x$ particles uniformly by using a small amount of the carbon material.

The treatment temperature (atmospheric temperature) of the chemical-vapor deposition (CVD) varies depending on the type of hydrocarbon gas used, but 600 to 1200° C. is suitable. In particular, the treatment temperature can be 700° C. or more, and in particular, 800° C. or more. As a result, a higher treatment temperature leads to lesser residual impurities, thereby allowing the formation of the coating layer containing highly conductive carbon.

While toluene, benzene, xylene, mesitylene or the like can be used as a liquid source of the hydrocarbon gas, toluene can be particularly useful because it is easy to handle. The hydrocarbon gas can be obtained by evaporating (e.g., bubbling with nitrogen gas) any of these kinds of the liquid source. It is also possible to use methane gas, acetylene gas, and the like.

After coating the surface of the $SiO_x$ particles ($SiO_x$ composite particles, or the $SiO_x$-carbon material granules) with the carbon material by the chemical vapor deposition (CVD), at least one organic compound selected from the group consisting of petroleum pitch, coal pitch, thermosetting resin, and a condensation product of naphthalene sulfonate and aldehydes can be adhered to the coating layer containing the carbon material. Then, the particles to which the organic compound is adhered can be fired.

In detail, a dispersion liquid is prepared in which an organic compound and $SiO_x$ particles (i.e., $SiO_x$ composite particles, or the $SiO_x$-carbon material granules) having coated with the carbon material are dispersed in a dispersion medium. Then, the dispersion liquid is sprayed and dried to form particles having coated with the organic compound. Then, the particles having coated with the organic compound are fired.

The pitch can be an isotropic pitch. The thermosetting resin can be phenol resin, furan resin, furfural resin or the like. The condensation product of naphthalene sulfonate and aldehydes can be a naphthalene sulfonate-formaldehyde condensation product.

The dispersion medium can be water or alcohols (e.g., ethanol) for dispersing the organic compound and the $SiO_x$ particles having their surfaces coated with the carbon material. The dispersion liquid can be usually sprayed in an atmosphere at a temperature of 50 to 300° C. The appropriate temperature of the firing can be 600 to 1200° C. Among the range above, it can be suitable at 700° C. or more, and in particular at 800° C. or more. A higher treatment temperature can result in lesser residual impurities, thereby forming the coating layer containing the carbon material with good quality having a high conductivity. However, the treatment temperature is required to be lower than or equal to the melting point of $SiO_x$.

When $SiO_x$ is used as the negative electrode active material of the lithium secondary battery of the present invention, it is favorable to further use graphite as the negative electrode active material. By using graphite, the ratio of $SiO_x$ in the negative electrode active material is decreased, but the graphite supplements the weight loss of the $SiO_x$ so that the drop of the high-capacity effects due to the weight loss of the $SiO_x$ can be restricted. Also, the volumetric change of the negative electrode (i.e., the negative electrode mixture layer) upon charge discharge of the battery can be suppressed; the drop of the battery properties by such a volumetric change can be restricted.

The examples of the graphite carbon material used as a negative electrode active material along with $SiO_x$ include: natural graphite such as scaly graphite; and artificial graphite obtained by graphitizing easily graphitizable carbons, such as pyrolytic carbons, mesophase carbon microbeads (MCMB) and carbon fiber, at 2800° C. or more.

In addition, in view of securing the high-capacity by using SiOx in the negative electrode of the present invention, it is favorable that the content of SiOx in the negative electrode active material is 0.01 mass % or more, and in particular, 3 mass % or more. Also, in view of evading the problem due to the volumetric change of the negative electrode upon charge and discharge, it is favorable that the content of SiOx in the negative electrode active material is 30 mass % or less, and in particular, 20 mass % or less.

Also, as the binder and the conductive assistant for the negative electrode, the same binder and the same conductive assistant as useful for the positive electrode can be used. Such examples are already listed before.

For example, the negative electrode can be prepared as follows: A negative electrode active material and a binder, as well as a conductive assistant, if necessary, are dispersed into a solvent such as NMP or water to prepare a composition in a paste or slurry containing a negative electrode mixture (here, the binder may be dissolved in the solvent), which is then applied to one surface or both surface of the current collector. After drying, a calendar process is applied, if necessary. It is noted that the manufacturing method of the negative electrode is not limited thereto, and other methods can be used.

Also, the negative electrode can be provided with a lead body for electrically connecting it to other members inside the lithium secondary battery, if necessary, which can be attached to by a known method.

For example, the thickness of the negative electrode mixture layer can be favorably 10 to 100 μm formed per each side of the current collector. For example, in the composition of the negative electrode mixture layer, the negative electrode active material can be included at e.g., 80.0 to 99.8 mass %, and the binder can be included at 0.1 to 10 mass %. Furthermore, when the conductive assistant is included in the negative electrode mixture layer, the conductive assistant can be favorably included at 0.1 to 10 mass % in the negative electrode mixture layer.

As the negative electrode current collector, a metal foil, punched metal, metal mesh, expanded metal or the like made of copper or nickel can be used. For example, a copper foil can be used. When reducing the thickness of the negative electrode as a whole to achieve a battery with a high energy density, the upper limit of the thickness of the negative electrode current collector can be 30 μm and the lower limit of the thickness of the negative electrode current collector can be 5 μm in order to ensure the mechanical strength.

It is desirable that the separator of the lithium secondary battery is provided with the property (so called, shut down function) in which its apertures are closed at a temperature of 80° C. or more (more favorably, 100° C. or more), and 170° C. or less (more favorably, 150° C. or less). For this purpose, a separator, e.g., fine porous membrane made of polyolefin such as polyethylene (PE) and polypropylene (PP) can be used, which are usually used in lithium secondary batteries. Such a fine porous membrane for the separator can be made of e.g., PE alone or PP alone, and also, it can be a laminate of PE fine porous membrane and a PP fine porous membrane.

For example, the thickness of the separator can be favorably 10 to 30 µm.

The positive electrode, the negative electrode and the separator can be a laminated electrode body in which the separator is placed between the positive electrode and the negative electrode. Furthermore, the laminated electrode body can be wound to be shaped into a winding electrode body that can be used in a lithium cell of the present invention.

The lithium secondary battery of the present invention can be in a barrel form (i.e., prismatic barrel form, cylindrical barrel form) of an exterior can made of steel or aluminum. Also, it can be a soft package battery in which its exterior can be provided with a laminated film with metal deposition.

The lithium secondary battery of the present invention can be used in the same applications as those of the conventionally known lithium secondary batteries.

EXAMPLES

Hereinafter, the present invention is described in more detail based on the examples. It is, however, noted that the following examples per se should not be used to narrowly construe the present invention.

Example 1

Preparation of the Positive Electrode 100 parts by mass of a positive electrode active material obtained by mixing $LiCoO_2$ and $Li_{1.0}Ni_{0.5}Co_{0.2}Mn_{0.3}O_2$ in a ratio (mass ratio) of 8:2, 20 parts by mass of an NMP solution including 10 mass % of PVDF (i.e., a binder), 1 part by mass of artificial graphite and 1 part by mass of ketjen (i.e., conductive assistants) were mixed and kneaded by using a twin screw extruder, and then to which more NMP was added to adjust viscosity to prepare a positive electrode mixture paste.

The positive electrode mixture paste was applied on both sides of an aluminum foil (i.e., a positive electrode current collector) having a thickness of 15 µm, and then, dried at 120° C. for 12 hours in vacuum to obtain a positive electrode mixture layer having formed on both sides of the aluminum foil. Then, press work was applied to adjust the thickness and density of the positive electrode mixture layer, and then, a lead body made of nickel was welded to an exposed part of the aluminum foil to prepare a strip-shaped positive electrode having a size of 375 mm in length and 43 mm in width. The positive electrode mixture layer for the positive electrode, as obtained, had a thickness 55 µm per one side.

<Preparation of the Negative Electrode>

97.5 parts by mass of a composite as the negative electrode active material [that was made by the SiO surfaces having been coated with the carbon material having an average particle diameter D50% of 8 mm (10 mass % of the carbon material included in the composite), which was mixed with graphite having an average particle diameter D50% of 16 mm in such a quantity that resulted in 3.75 mass % of the composite having the SiO surfaces coated with the carbon material]; 1.5 parts by mass of SBR as a binder; 1 part by mass of CMC as a thickener; and water was added for mixture to prepare a negative electrode composition paste.

The negative electrode mixture paste as obtained above was applied on both sides of a copper foil having a thickness of 8 µm (i.e., a negative electrode current collector), and then dried in vacuum at 120° C. for 12 hours to have formed a negative electrode mixture layer on both sides of the copper foil. Then, press work was performed to adjust the thickness and density of the negative electrode mixture layer, and then, a lead body made of nickel was welded to an exposed part of the copper foil to prepare a strip-shaped negative electrode having a size of 380 mm in length and 44 mm in width. The negative electrode mixture layer for the negative electrode had a thickness of 65 µm per one side.

<Preparation of Nonaqueous Electrolyte>

Into a mixture solvent of ethylene carbonate (EC), methylethyl carbonate (MEC) and diethyl carbonate (DEC) at a volume ratio of 2:3:1, $LiPF_6$ was dissolved at a concentration of 1 mol/L. Then, each of EDPA, 1,3-dioxane, VC and FEC was added at a quantity of 1 mass %, to prepare a nonaqueous electrolyte liquid.

<Assembling of Battery>

The strip-shaped positive electrode was deposited on the strip-shaped negative electrode with intervention of a microporous polyethylene separator having a thickness of 16 µm (porosity: 41%), which was then wound into a winding form, and then, pressurized into a flat-shaped to provide an winding electrode body with a flat-shaped winding structure. This winding electrode body was fixed with an insulating tape of polypropylene. Then, the winding electrode body was inserted into a prismatic battery case of an aluminum alloy having an external size of 4 0 mm in thickness, 34 mm in width, and 50 mm in height. A lead body was welded, and a lid plate made of aluminum alloy was welded to the opening end of the battery case. Then, the nonaqueous electrolyte was injected through an injection hole provided on the lid plate. After having kept still for one hour, the injection hole was sealed to obtain a lithium secondary battery having a structure as shown in FIG. 1, whose appearance is illustrated in FIG. 2.

Figure 2:
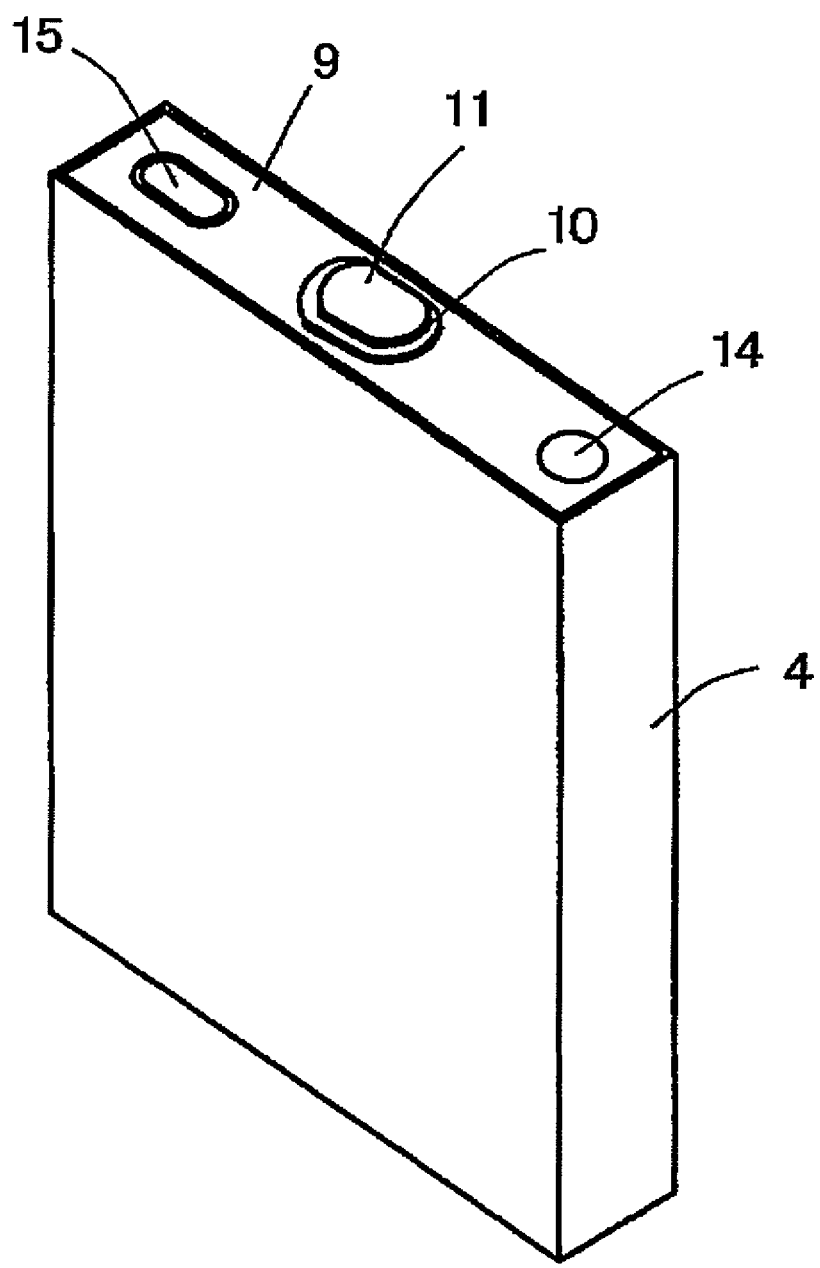
FIG. 2 is a perspective view of the lithium secondary battery of FIG. 1.

Here, the battery shown FIGS. 1 and 2 is explained. FIG. 1(*a*) is a plan view, and FIG. 1(*b*) is a partial cross-sectional view. As shown in FIG. 1(*b*), the positive electrode 1 and the negative electrode 2 with intervention of the separator 3 were wound in a winding body, which was then pressurized into the flat-shape to make a flat-shaped winding electrode body 6, which was then housed into the battery case 4 of a prismatic shape (i.e., prism barrel shape) together with the nonaqueous electrolyte. It is noted that in order to avoid any complicatedness, FIG. 1 does not include the illustration of the metal foil as current collectors used in the preparation of the positive electrode 1 and negative electrode 2, and the nonaqueous electrolyte.

The battery case 4 is made of aluminum alloy, serving as an exterior body of the battery, and the battery case 4 functions as a positive terminal. Also, an insulator 5 made of a PE sheet is placed on the bottom of battery case 4. From the flat-shaped winding electrode body 6 having the positive electrode 1, the negative electrode 2 and the separator 3, a positive electrode lead body 7 and a negative electrode lead body 8 are drawn from each of one end of the positive electrode 1 and the negative electrode 2. Also, to the enclosing lid plate 9 made of aluminum alloy to close the opening of the battery case 4, a terminal 11 made of stainless steel is attached via an insulating packing 10 made of polypropylene, the terminal 11 has attached to a lead board 13 made of stainless steel via an insulator 12.

Also, the lid plate 9 was inserted in the opening of the battery case 4. By welding the joint parts of the both, the opening of battery case 4 was closed such that the battery inside was sealed. Also, the battery of FIG. 1 is provided with a nonaqueous electrolyte liquid injection hole 14 on the lid plate 9. This nonaqueous electrolyte liquid injection hole 14 was laser-welded in a state where a sealing material was inserted, so that the seal of the battery was secured. (It is noted that in the battery of FIG. 1 and FIG. 2, the nonaqueous electrolyte liquid injection hole 14, in fact, is composed of the nonaqueous electrolyte liquid injection hole and the sealing material, but for simple explanation, only the nonaqueous electrolyte liquid injection hole 14 is illustrated.). Furthermore, the lid plate 9 was provided with a cleavage vent 15 serving as a mechanism to exhaust internal gas outside when increasing the temperature of the battery.

In the battery of Example 1, the positive electrode lead body 7 was directly welded to the lid plate 9 such that the battery case 4 and the lid plate 9 function as a positive terminal. Also, the negative electrode lead body 8 was welded to the lead board 13. The negative electrode lead body 8 was connected to the terminal 11 through the lead board 13. Thereby, the terminal 11 functions as a negative electrode terminal. However, depending on the materials of the battery case 4, the positive or negative can be reversed.

FIG. 2 is a perspective view schematically showing the appearance of the battery of FIG. 1. FIG. 2 was illustrated for the purpose to show that the battery was a prism shape battery. The battery as shown in FIG. 1 is schematically illustrated, showing only a part of the components of the battery. Also, in FIG. 1, it is noted that the inner part of the winding electrode body is not shown as a cross sectional view.

Examples 2 to 5 and Comparative Examples 1 to 4

Except for changing the quantities of EDPA and 1,3-dioxane as shown in Table 1, the same procedure as Example 1 were performed to prepare a nonaqueous electrolyte liquid. Except for using the nonaqueous electrolyte liquid above, the same procedure as Example 1 was performed to prepare a lithium secondary battery.

Example 6

Except for using PDEA instead of EDPA, the same procedure as Example 1 was performed to prepare a nonaqueous electrolyte liquid. Except for using the nonaqueous electrolyte liquid above, the same procedure as Example 1 was performed to prepare a lithium secondary battery.

Example 7

100 parts by mass of a positive electrode active material that was obtained by mixing $LiCoO_2$ and $Li_{0.98}Ni_{0.87}Co_{0.091}Mn_{0.012}Al_{0.012}Mg_{0.012}Ba_{0.0025}O_2$ in a ratio (mass ratio) of 8:2; 20 parts by mass of an NMP solution including PVDF as a binder at a concentration of 10 mass %; and 1 part by mass of artificial graphite and 1 part by mass of ketjen black as conductive assistants were mixed and kneaded by using a twin screw extruder, and then, to which more NMP was added to adjust the viscosity to prepare a positive electrode mixture paste.

Except for using the positive electrode mixture paste above, the same procedure as Example 1 was performed to prepare a positive electrode. Except for using the positive electrode above, the same procedure as Example 6 was performed to prepare a lithium secondary battery.

Comparative Example 5

Except for using the nonaqueous electrolyte liquid having prepared in Comparative Example 1, the same procedure as Example 7 was performed to prepare a lithium secondary battery.

The additives and their quantities having added in the nonaqueous electrolyte liquid used in each lithium secondary battery of Examples 1 to 7 and Comparative Examples 1 to 5 are shown in Table 1. It is noted that "Reference Example" in Table 1 is the same as the battery of Comparative Example 2. (The details of the Reference Example are explained later).

With respect to each lithium secondary battery of Examples 1 to 7 and Comparative Examples 1 to 5, the evaluation was performed as follows. The results are shown in Table 2.

<Initial Capacity Measurement>

Each lithium secondary battery of the Examples and the Comparative Examples was applied to a constant current charge at a current value of 1.0 C to reach 4.35V, followed by a constant voltage charge at the voltage of 4.35V. Here, the total charge duration of the constant current charge and the constant voltage charge was 2.5 hours. Then, it was discharged at a current value of 0.2 C to reach 3.0V where the initial capacity was measured.

It is noted that the battery of Comparative Example 2 was also treated as Reference Example, and its initial capacity was also measured as to the charge and the discharge at the same condition except for setting 4.2V as the stop voltage of the constant current charge and the voltage of the constant voltage charge.

<Load Property Evaluation>

With respect to each lithium secondary battery of the Examples and the Comparative Examples, the constant current charge and the constant voltage charge were performed at the same condition as measuring the initial capacity measurement, and then, it was discharged at a current value of 1.5 C to reach 3.0V to detect the discharge capacity (i.e., 1.5 C discharge capacity). Then, the 1.5 C discharge capacity of each battery was divided by the initial capacity, whose value was expressed as a percentage, that is, a capacity retention rate. Namely, as the capacity retention rate becomes higher, the battery is more superior in the load property.

As to the battery of Comparative Example 2 treating as Reference Example, its 1.5 C discharge capacity was measured at the same conditions except for setting 4.2V as the stop voltage of the constant current charge and the voltage of the constant voltage charge. Using the value obtained as well as the initial capacity of the Reference Example, a capacity retention rate was calculated.

<Charge Discharge Cycle Property Evaluation>

Each lithium secondary battery of the Examples and the Comparative Examples (here, different batteries were used from those used for the evaluation above) was applied to a constant current charge and a constant voltage charge at the same conditions as measuring the initial capacity, followed by discharging it at a current value of 1.5 C to reach 3.0V. These continuous steps were assumed to be one cycle, which were repeated for 500 cycles of the charge and the discharge. Then, each battery was charged and discharged at the same conditions as measuring the initial capacity, and then, the discharge capacity of each battery after the 500 cycles was measured. The value as obtained was divided by the initial capacity, which was expressed as a percentage, that is, a capacity retention rate. As the capacity retention rate becomes higher, it is considered that the battery is more superior in the charge discharge cycle property. Here, the charge discharge cycle property evaluation above was performed in an environmental condition of room temperature (25° C.) as well as in an environmental condition of 45° C.

In addition, the battery of Comparative Example 2 treated as Reference Example was applied to detect the discharge capacities after the 500 cycles both at room temperature environment and at the 45° C. environment at the same conditions except for setting 4.2V as the stop voltage of the constant current charge and the voltage of the constant voltage charge. Using these values and the initial capacity of Reference Example, the capacity retention rates were calculated.

<High Temperature Storage Property Evaluation>

Each lithium secondary battery of the Examples and the Comparative Examples (here, the batteries were different from those having been evaluated before) was applied to a constant current charge and a constant voltage charge at the same conditions as measuring the initial capacity; and then, the battery was stored under an environment of 85° C. for four hours. Then, the change in the thickness of the battery (i.e., the amount of swollenness) between the pre-storage and post-storage was measured.

Also, each battery after the thickness measurement was discharged at a current value of 0.2 C to reach 3.0V, followed by applying the constant current charge and the constant voltage charge at the same conditions as measuring the initial capacity. Then, the battery was discharged at a current value of 0.2 C to reach 3.0V. Then, the discharge capacity after the high temperature storage was measured. As the discharge capacity after the high temperature storage is close to the initial capacity, the battery having applied to the high temperature storage has better capacity recovery property, thereby being superior in the high temperature storage property as a battery.

In addition, with respect to the battery of Comparative Example 2 treated as Reference Example, the change in the thickness of the battery between the pre-storage and the post-storage, and the discharge capacity after the high temperature storage were measured at the same conditions except for setting 4.2V as the stop voltage of the constant current charge and the voltage of the constant voltage charge.

TABLE 1

| | Additives in the nonaqueous electrolyte liquid | | | |
|---|---|---|---|---|
| | phosphonoacetate compound | | Amount of 1,3-dioxane (mass %) | Amount of VC (mass %) | Amount of FEC (mass %) |
| | Kind | Amount (mass %) | | | |
| Ex. 1 | EDPA | 1 | 1 | 1 | 1 |
| Ex. 2 | EDPA | 0.1 | 0.1 | 1 | 1 |
| Ex. 3 | EDPA | 5 | 0.1 | 1 | 1 |
| Ex. 4 | EDPA | 0.1 | 5 | 1 | 1 |
| Ex. 5 | EDPA | 5 | 5 | 1 | 1 |
| Ex. 6 | PDEA | 1 | 1 | 1 | 1 |
| Ex. 7 | PDEA | 1 | 1 | 1 | 1 |
| Comp. Ex. 1 | — | 0 | 0 | 1 | 1 |
| Comp. Ex. 2 (Ref. Ex.) | EDPA | 2 | 0 | 1 | 1 |
| Comp. Ex. 3 | — | 0 | 2 | 1 | 1 |
| Comp. Ex. 4 | EDPA | 7 | 7 | 1 | 1 |
| Comp. Ex. 5 | — | 0 | 0 | 1 | 1 |

TABLE 2

| | Initial capacity (mAh) | Load property, capacity retention rate (%) | Charge discharge cycle property, capacity retention rate (%) | | High temperature storage property | |
|---|---|---|---|---|---|---|
| | | | Room temp. | 45° C. | Swollen amount (mm) | Capacity after storage (mAh) |
| Ex. 1 | 1737 | 97.3 | 85.5 | 74.3 | 0.7 | 1534 |
| Ex. 2 | 1734 | 97.4 | 82.4 | 71.3 | 1.1 | 1522 |
| Ex. 3 | 1732 | 96.8 | 80.2 | 72.7 | 0.7 | 1530 |
| Ex. 4 | 1731 | 97.3 | 81.2 | 71.2 | 1.4 | 1511 |
| Ex. 5 | 1728 | 97 | 80.9 | 70.5 | 1.3 | 1516 |
| Ex. 6 | 1760 | 97.7 | 88 | 76.3 | 0.6 | 1590 |
| Ex. 7 | 1900 | 97.8 | 89 | 78.2 | 0.8 | 1576 |
| Comp. Ex. 1 | 1731 | 97.1 | 77.7 | 68.4 | 1.8 | 1454 |
| Comp. Ex. 2 (Ref. Ex.) | 1733 | 93.5 | 73.2 | 67.2 | 0.7 | 1522 |
| | 1672 | 96.8 | 82.3 | 73.1 | 0.7 | 1482 |
| Comp. Ex. 3 | 1730 | 97.3 | 84.3 | 69.2 | 2.6 | 1434 |
| Comp. Ex. 4 | 1621 | 91.2 | 65.7 | 68.1 | 3.1 | 1388 |
| Comp. Ex. 5 | 1880 | 97.4 | 77.5 | 67.8 | 3.6 | 1380 |

The lithium secondary batteries of Examples 1 to 7 are the examples in which a composite of the SiOx and the carbon material, together with graphite was used as the negative electrode active material. As shown in Table 1 and Table 2, these examples used the nonaqueous electrolyte liquid including the phosphonoacetate compound represented by general formula (1) and 1,3-dioxane at appropriate quantities. Therefore, these batteries were high in the capacity retention rate at the time of the load property evaluation, and the capacity retention rates after the 500 cycles both at room temperature and at 45° C., thereby indicating that these batteries were superior both in the load property as well as the charge discharge cycle property both at room temperature and at a high temperature. Also, the lithium secondary batteries of Examples 1 to 7 could restrict the swollenness during the high temperature storage. Furthermore, after the high temperature storage, the drop from the initial capacity of the discharge capacity was reduced, thereby indicating that they were superior in the high temperature storage property, as well. In particular, the lithium secondary battery of Example 7 was an example having used the positive electrode active material including a high concentration of Ni, that is, low in the heat stability. However, it could accomplish the high temperature storage properties in the same level as those of the lithium secondary batteries of Examples 1 to 6.

By contrast, the batteries of Comparative Examples 1 and 5 used the nonaqueous electrolyte liquid without including the phosphonoacetate compound represented by general formula (1) and 1,3-dioxane. These batteries were low in the capacity retention rates after the 500 cycles both at room temperature and at 45° C., thereby indicating that they were inferior in the charge discharge cycle property. Also, the battery of Comparative Example 5 used the positive electrode active material including a high content of Ni, which resulted in showing of a large amount of the swollenness during the high temperature storage. Furthermore, after the high temperature storage, the battery showed a large drop compared with the initial capacity of the discharge capacity, thereby indicating that it was inferior in the high temperature storage property.

Also, the battery of Comparative Example 2 used the nonaqueous electrolyte liquid which had included a phosphonoacetate compound represented by general formula (1), but which had not include 1,3-dioxane. This battery was low both in the capacity retention rate at the time of the load property evaluation and the capacity retention rates after the 500 cycles both at room temperature and at 45° C. Thus, this battery was said to be inferior both in the load property and the charge discharge cycle property at room temperature and at a high temperature.

In addition, as the Reference Example, the battery of Comparative Example 2 was evaluated by adopting the condition of 4.2V as the upper limit voltage in the charge. Here, in all evaluation results of the load property, the charge discharge cycle property both at room temperature and at a high temperature, and the high temperature storage property, the battery of Reference Example was not inferior to those of the Examples. Thus, the problems to be solved by the present invention are associated with the conditions where the upper limit voltage of the charge is raised, namely, where the battery is charged at a condition exceeding 4.25V of the battery voltage.

Also, the battery of Comparative Example 3 used the nonaqueous electrolyte liquid which included 1,3-dioxane but which did not include the phosphonoacetate compound represented by general formula (1). In this battery, there was a large amount of swollenness during the high temperature storage, while there was a large drop of the discharge capacity from its initial capacity after the high temperature storage. These results indicated that the battery was inferior in the high temperature storage property.

Also, the battery of Comparative Example 4 used the nonaqueous electrolyte liquid which included excess amounts of the phosphonoacetate compound represented by general formula (1) and 1,3-dioxane. This battery was inferior to, all aspects of the load property, the charge discharge cycle properties both at room temperature and at high temperature, and the high temperature storage property.

In addition, the battery of Comparative Example 3 is compared with the battery of e.g., Example 1, with respect to the charge discharge cycle property of the batteries. Here, the battery of Comparative Example 3 used the nonaqueous electrolyte liquid including only 1,3-dioxane having an action to improve the charge discharge cycle property of the battery. Both at room temperature and at the high temperature, the battery of Example 1 was superior to the battery of Comparative Example 3. The nonaqueous electrolyte liquid of the battery of Example 1 included the phosphonoacetate compound represented by general formula (1) which is considered to act to deteriorate the charge discharge cycle property of the battery. In addition, the nonaqueous electrolyte liquid of the battery of Example 1 included 1,3-dioxane at a lesser amount than the nonaqueous electrolyte liquid of the battery of Comparative Example 3. Nonetheless, with respect to the charge discharge cycle property, the evaluation results above were obtained. Therefore, it is considered that in the lithium secondary batteries in accordance with the Examples, the phosphonoacetate compound represented by general formula (1) together with 1,3-dioxane showed synergistic effects to achieve the improvement of the charge discharge cycle property both at room temperature and at the high temperature.

Example 8

A negative electrode was prepared by the same procedure as Example 1 except for changing the negative electrode active material by replacing the mixture identified above with the same graphite as used in Example 1. Except for using this negative electrode, the same procedure as Example 1 was performed to prepare a lithium secondary battery.

Example 9

Except for using PDEA instead of EDPA, the same procedure as Example 1 was performed to prepare a nonaqueous electrolyte liquid. Except for using this nonaqueous electrolyte liquid, the same procedure as Example 8 was performed to prepare a lithium secondary battery.

Example 10

Except for using the same positive electrode having manufactured in Example 7, the same procedure as Example 9 was performed to prepare a lithium secondary battery.

Comparative Example 6

A negative electrode was prepared by the same procedure as Example 1 except for changing the negative electrode active material by replacing the mixture identified above with the same graphite as used in Example 1. Except for using this negative electrode, the same procedure as Comparative Example 1 was performed to prepare a lithium secondary battery.

Comparative Example 7

Except for using the same positive electrode having manufactured in Example 7, the same procedure as Comparative Example 6 was performed to prepare a lithium secondary battery.

Table 3 shows the additives and quantities added in the nonaqueous electrolyte liquids used in each of the lithium secondary batteries of Examples 8 to 10 and Comparative Examples 6 and 7.

The lithium secondary batteries of Examples 8 to 10 and Comparative Examples 6 and 7, the evaluations were conducted in the same manner as having evaluated on the battery of Example 1. The results are shown in Table 4.

TABLE 3

| | Additives in the nonaqueous electrolyte liquid | | | |
|---|---|---|---|---|
| | phosphonoacetate compound | | Amount of 1,3-dioxane (mass %) | Amount of VC (mass %) | Amount of FEC (mass %) |
| | Kind | Amount (mass %) | | | |
| Ex. 8 | EDPA | 1 | 1 | 1 | 1 |
| Ex. 9 | PDEA | 1 | 1 | 1 | 1 |
| Ex. 10 | PDEA | 1 | 1 | 1 | 1 |
| Comp. Ex. 6 | — | 0 | 0 | 1 | 1 |
| Comp. Ex. 7 | — | 0 | 0 | 1 | 1 |

TABLE 4

| | Initial capacity (mAh) | Load property, retention rate (%) | Charge discharge cycle property, capacity retention rate (%) | | High temperature storage property | |
|---|---|---|---|---|---|---|
| | | | Room temp. | 45° C. | Swollen amount (mm) | Capacity after storage (mAh) |
| Ex. 8 | 1685 | 97.3 | 91.3 | 82.4 | 0.6 | 1563 |
| Ex. 9 | 1700 | 98 | 93 | 83.3 | 0.5 | 1575 |
| Ex. 10 | 1720 | 98.2 | 93 | 83.1 | 0.7 | 1570 |
| Comp. Ex. 1 | 1682 | 97.2 | 87.5 | 75.4 | 0.9 | 1511 |
| Comp. Ex. 2 | 1716 | 98 | 86.3 | 70.7 | 1.2 | 1470 |

See Table 3 and Table 4. The lithium secondary batteries of Examples 8 to 10 used graphite alone as negative electrode active material. In particular, these examples used the non-aqueous electrolyte liquid including the phosphonoacetate compound represented by general formula (1) and 1.3-dioxane at appropriate quantities. It was in the same manner as the lithium secondary batteries of Examples 1 to 7 having used SiOx and graphite as the negative electrode active material. In the Examples of Examples 8 to 10, the load property, the charge discharge cycle property both at room temperature and at a high temperature, and the high temperature storage property were excellent to those of the batteries of Comparative Examples 6 and 7 having used the nonaqueous electrolyte liquid which did not include the phosphonoacetate compound represented by general formula (1) and 1,3-dioxane.

Also, the lithium secondary battery of Example 10 used the positive electrode active material of Ni at a high content, that is, low in the heat stability. Nonetheless, it was found that the high temperature storage property was secured in the same level as those of the lithium secondary batteries of Examples 8 and 9 that have used the positive electrode active material of Ni at a low content.

The lithium secondary battery of the present invention can be applied with a stop voltage of more than 4.25V before using. The stop voltage can be between 4.25V and 5.00V, and in particular, between 4.35V and 4.80V.

The lithium secondary battery of the present invention can be provided with the charge discharge cycle property at 45° C. such that the capacity retention rate is maintained between 70.5 to 83.3%, when measured at the condition as identified below:

A lithium secondary battery is applied to a constant current charge at a current value of 1.0 C to reach 4.35V, followed by a constant voltage charge at the voltage of 4.35V. Here, the total charge duration of the constant current charge and the constant voltage charge is set to be 2.5 hours. Then, it is discharged at a current value of 0.2 C to reach 3.0V to measure a capacity; that is the initial capacity.

After measuring the initial capacity as explained above, the same lithium secondary battery is applied to a constant current charge at a current value of 1.0 C to reach 4.35V, followed by a constant voltage charge at the voltage of 4.35V. Here, the total charge duration of the constant current charge and the constant voltage charge is set to be 2.5 hours. After the constant voltage charge, the lithium secondary battery is discharged at a current value of 1.5 C to reach 3.0V. These continuous steps including the constant current charge, the constant voltage charge and the discharge are assumed to be one cycle. This cycle is repeated for 500 cycles at an environment of 45° C.

After the 500 cycles of the charge discharge operations, the lithium secondary battery is again charged and discharged at the same conditions as measuring the initial capacity, and then, the discharge capacity is measured; that is the discharge capacity after the 500 cycles.

Then, the capacity retention rate is shown as a percentage from the calculation by dividing the discharge capacity after the 500 cycles by the initial capacity.

It is noted that the references in the drawings are:
1: positive electrode
2: negative electrode
3: separator.

What is claimed is:

1. A lithium secondary battery, comprising a positive electrode, a negative electrode, a nonaqueous electrolyte liquid and a separator, subjected to a constant-current constant-voltage charge is applied with a stop voltage of more than 4.25V before using,
   wherein the nonaqueous electrolyte liquid used in the lithium secondary battery contains 0.1 to 5 mass % of a phosphonoacetate compound represented by General Formula (1), and 0.1 to 5 mass % of 1,3-dioxane:

Chemical Formula 1

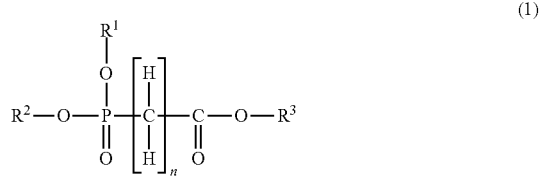

(1)

where in General Formula (1), each of $R^1$, $R^2$ and $R^3$ is independently hydrocarbon groups having a carbon number of 1 to 12 with or without substituent of a halogen atom, and n is 0 to 6 integers.

2. The lithium secondary battery of claim 1, wherein the negative electrode comprises a negative electrode mixture layer containing a material including constituent elements of Si and O as a negative electrode active material (an atom ratio x of O to Si being $0.5 \leq x \leq 1.5$), formed on one side or both sides of a current collector.

3. The lithium secondary battery of claim 1, wherein a negative electrode mixture layer of the negative electrode comprises a composite of a material including Si and O as constituent elements, and a first carbon material,
   wherein in the composite, a first surface of the material including Si and O as constituent elements is coated with the first carbon material.

4. The lithium secondary battery of claim 3, wherein a second carbon material is coated on a second surface of the composite, wherein the composite is of the material including Si and O as constituent elements coated with the first carbon material.

5. The lithium secondary battery of claim 1, wherein the negative electrode comprises a negative electrode mixture layer containing graphite as the negative electrode active material.

6. The lithium secondary battery of claim 2, wherein the negative electrode mixture layer of the negative electrodes further comprises graphite as the negative electrode active material.

7. The lithium secondary battery of claim 3, wherein the negative electrode mixture layer of the negative electrodes further comprises graphite as the negative electrode active material.

8. The lithium secondary battery of claim 1, wherein the nonaqueous electrolyte used in the lithium secondary battery further contains a halogen-substituted cyclic carbonate.

9. The lithium secondary battery of claim 2, wherein the nonaqueous electrolyte used in the lithium secondary battery further contains a halogen-substituted cyclic carbonate.

10. The lithium secondary battery of claim 3, wherein the nonaqueous electrolyte used in the lithium secondary battery further contains a halogen-substituted cyclic carbonate.

11. The lithium secondary battery of claim 1, wherein the nonaqueous electrolyte used in the lithium secondary battery further contains vinylene carbonate.

12. The lithium secondary battery of claim 8, wherein the nonaqueous electrolyte used in the lithium secondary battery further contains vinylene carbonate.

\* \* \* \* \*